(12) United States Patent
Aarts

(10) Patent No.: US 7,088,779 B2
(45) Date of Patent: Aug. 8, 2006

(54) METHOD AND APPARATUS FOR REDUCING THE WORD LENGTH OF A DIGITAL INPUT SIGNAL AND METHOD AND APPARATUS FOR RECOVERING A DIGITAL INPUT SIGNAL

(75) Inventor: Ronaldus Maria Aarts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 743 days.

(21) Appl. No.: 09/938,378

(22) Filed: Aug. 24, 2001

(65) Prior Publication Data
US 2002/0025004 A1 Feb. 28, 2002

(30) Foreign Application Priority Data
Aug. 25, 2000 (EP) ................... 00202977

(51) Int. Cl.
*H04B 14/06* (2006.01)
(52) U.S. Cl. ............ 375/245; 375/240; 375/260; 375/244; 375/377; 341/131; 341/138; 386/40; 704/226; 704/230
(58) Field of Classification Search ............ 375/243, 375/245, 286, 287, 367, 254, 346, 240, 260; 341/126, 131, 138; 386/40, 169; 704/226, 704/230, 234; 348/607; 455/296; 322/310, 322/551; 382/233
See application file for complete search history.

(56) References Cited

U.S. PATENT DOCUMENTS

| 5,287,420 A | * | 2/1994 | Barrett ................. 382/233 |
| 5,402,124 A | * | 3/1995 | Todd et al. ........... 341/131 |
| 5,774,842 A | * | 6/1998 | Nishio et al. ........ 704/226 |
| 5,901,178 A | * | 5/1999 | Lee et al. ............. 375/240 |
| 5,946,652 A | * | 8/1999 | Heddle ................. 704/230 |

FOREIGN PATENT DOCUMENTS
GB 2293297 A 3/1996

* cited by examiner

Primary Examiner—Khai Tran
Assistant Examiner—Edith Chang
(74) Attorney, Agent, or Firm—Edward W. Goodman

(57) ABSTRACT

A method and signal processing apparatus for reducing the number of bits of a digital input signal ($M_i$), includes adding a pseudo-random noise signal ($N_a$) to the digital input signal ($M_i$) to obtain an intermediate signal ($D_i$), the pseudo-random noise signal ($N_a$) being defined by noise parameters ($N_p$), and quantizing the intermediate signal ($D_i$), having a word length of n bits, to a reduced word-length signal ($M_e$) having a word length of m bits, n being larger than or equal to m. The method further includes quantizing the intermediate signal ($D_i$) using a first transfer function which is non-linear, the first transfer function being defined by non-linear device parameters ($NLD_p$).

6 Claims, 2 Drawing Sheets

METHOD AND APPARATUS FOR REDUCING THE WORD LENGTH OF A DIGITAL INPUT SIGNAL AND METHOD AND APPARATUS FOR RECOVERING A DIGITAL INPUT SIGNAL

BACKGROUND OF THE INVENTION

1. Field of the Invention

The present invention relates to a method for reducing the number of bits of a digital input signal, comprising the steps of adding a pseudo-random noise signal to the digital input signal to obtain an intermediate signal, the pseudo-random noise signal being defined by noise parameters, and quantizing the intermediate signal, having a word length of n bits, to a reduced word-length signal, having a word length of m bits, n being larger than or equal to m. In a further aspect, the present invention relates to a signal processing apparatus comprising a pseudo-random noise generator for generating a noise signal being defined by noise parameters, an addition element connected to the noise generator for adding the noise signal to a digital input signal to provide an intermediate signal, and a first quantizing element connected to the addition element for transforming the intermediate signal, having a word length of n bits, into a reduced word-length signal, having a word length of m bits, n being larger than or equal to m.

2. Description of the Related Art

British Patent Application No. GB-A-2 293 297 describes an apparatus for processing an input digital signal with a word length of 32 bits to generate an output digital signal of a lower resolution (16 bits). Before converting the digital signal to an output digital signal with the lower resolution, pseudo-random noise is added to the input digital signal. Adding the noise results in a dithering of the signal, in order to smooth out the harsh linear transfer function of the 32-bit to 16-bit quantizer. When reproducing the digital signal, the identical noise signal is subtracted from the recorded signal to provide a substantially noise-free 16-bit signal. Synchronization of the noise signal and the digital signal is achieved by regenerating an indicator signal from the recorded signal.

Present day quantization of signals for recording on a recording medium, such as compact discs, is limited to 16 bits, resulting in a maximum dynamic range of only 96 dB. Although it is possible to use the same recording techniques for recording digital signals with a larger word length and thus higher dynamic range, such a recording would not be compatible with older systems for replay. The method and system described in GB-A-2 293 297 improve the quality of playback of the signal by adding noise to the signal before quantizing, but as the synchronization and noise parameter data are included in the recorded signal, identical copying of the recorded signal is possible.

SUMMARY OF THE INVENTION

The present invention therefore seeks to provide a method and apparatus for reducing the word length of a digital signal having an increased dynamic range, while remaining backwards compatible with methods and apparatus for replaying the reduced word-length signal, such as the standardized CD-signal of 16 bits. Also, it should be possible with the present invention to provide an anti-copy protection of the quantized signal.

The present invention provides a method according to the preamble defined above, in which the step of quantizing the intermediate signal comprises a first transfer function which is non-linear, the first transfer function being defined by non-linear device parameters. By properly choosing the noise parameters and non-linear device parameters, it is possible to obtain a reduced word-length signal which may be recovered or replayed using conventional means, but with a reduced quality. When n is equal to m, no reduction in bit length occurs, but the effect of the non-linear transfer device and the addition of noise remain.

In a further embodiment, a quantization step of the first transfer function for small amplitudes is smaller than a quantization step for large amplitudes. Preferably, the gain of the first transfer function is substantially equal to one for small amplitudes, and in which the gain decreases for large amplitudes. An example of a transfer function is given by the function $M_e/D_i = c_1 \tan h(c_2 D_i + c_3)$, in which $M_e$ is the reduced word length signal, $D_i$ is the intermediate signal and $c_1$, $c_2$, $c_3$ are the non-linear device parameters. The first transfer function determines the amount of distortion in the reduced word-length signal. The human ear is more sensitive to noise in small amplitude signals than to noise in large amplitude signals. This psycho-acoustic effect allows adding noise to degrade the reduced word-length signal while still being discernible and audible, be it at a reduced quality level.

In a further embodiment, the amplitude of the noise signal is at least equal to a predetermined noise value. This predetermined noise value is chosen to assure that a dither effect is provided, even for large amplitude signals.

Noise-shaping techniques may be applied to obtain the noise signal having more preferred characteristics.

In an even further embodiment, the reduced word-length signal, the non-linear device parameters and/or the noise parameters are recorded on a recording medium. As an example, the recording medium is a compact disc, and the reduced word-length signal is recorded on a first channel and the non-linear device parameters and/or the noise parameters are recorded on a second channel, the first channel and second channel being separate channels. This enables providing a low quality reduced word-length signal, e.g., as a preview (better pre-listen) signal. Only when the receiver also receives the non-linear device parameters and the noise parameters, the original full quality digital signal can be recovered. As the non-linear device parameters and noise parameters are distributed over a channel separate from the reduced word-length signal, the present method also provides an anti-copying capability of the high quality signal.

Also, the present method may comprise the further step of providing a difference signal, the difference signal being equal to the intermediate signal minus the reduced word-length signal.

The present invention also relates to a method for recovering an output signal from a reduced word-length signal provided by the method according to the present invention, comprising the steps of quantizing the reduced word-length signal having m bits to a decoded signal having n bits, the quantizing being defined by a second transfer function, the second transfer function being the inverse of the first transfer function. This enables recovering an output signal having the original word length of the original digital input signal, providing an output signal with a high dynamic range.

In a preferred embodiment, a subtraction noise signal is subtracted from the decoded signal in order to provide the output signal, the subtraction noise signal being substantially equal to the noise signal. This embodiment enables recovering an output signal with a high quality level, the only additional degradation of the original digital input signal being formed by the quantization noise introduced by the non-linear quantization operation. By properly choosing the non-linear device parameters and noise parameters, this additional degradation may be limited to an acceptable level.

In a second aspect, the present invention relates to a signal processing apparatus according to the preamble defined above, in which the quantizing element has a non-linear transfer function, the non-linear transfer function being defined by non-linear device parameters. More preferably, the signal processing is arranged to execute the method according to the present invention.

Also, the present invention relates to a signal decoding apparatus for recovering an output signal from a reduced word-length signal provided by the signal processing apparatus described above, comprising a second quantization element having a second transfer function for transforming the reduced word-length signal into a decoded output signal, the second transfer function being the inverse of the first transfer function.

In a preferred embodiment, the signal decoding apparatus comprises a second noise source for providing a subtraction noise signal to a subtraction element, the subtraction noise signal being substantially equal to the noise signal, the subtraction element being arranged for subtracting the subtraction noise signal from the decoded signal in order to provide the output signal.

The present invention may be applied to all sorts of digital signals, representing e.g., an audio signal or a video signal.

BRIEF DESCRIPTION OF THE DRAWINGS

The present invention will be described in more detail with the aid of exemplary embodiments with reference to the accompanying drawing, in which.

DESCRIPTION OF THE PREFERRED EMBODIMENTS

Figure 1:
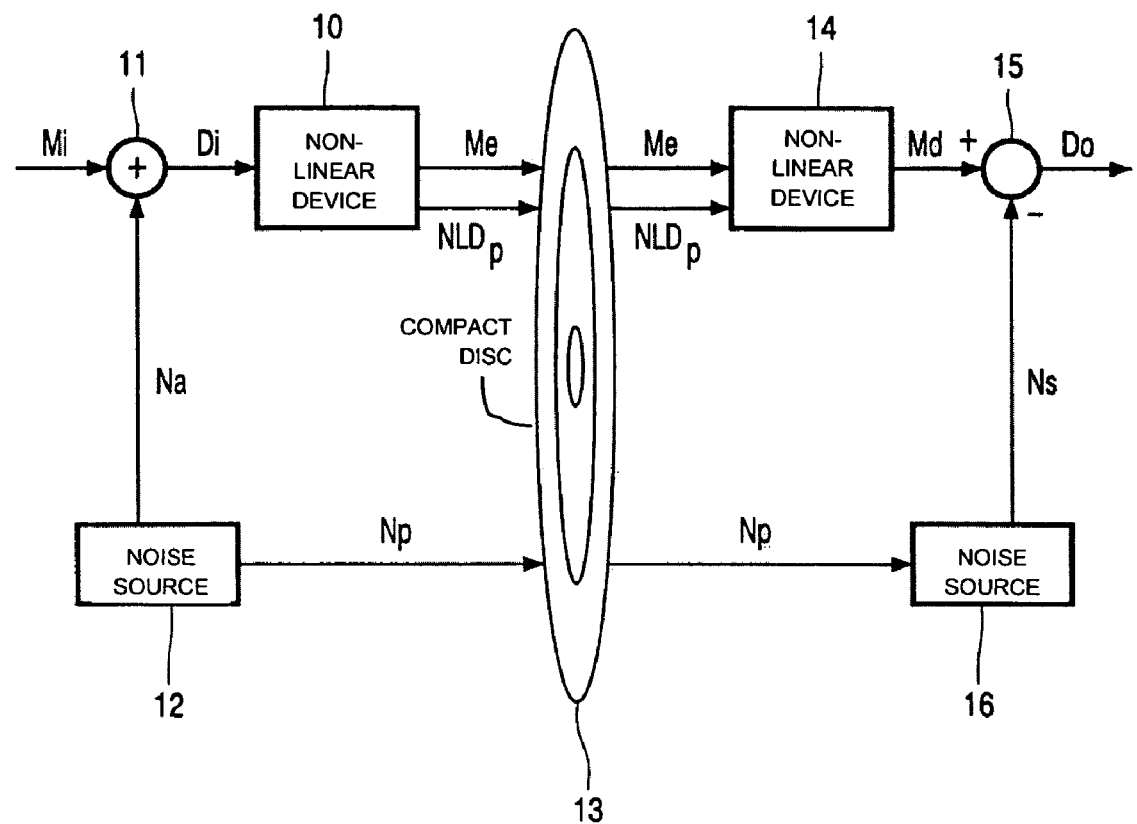
FIG. 1 shows a block schematic diagram of a first embodiment of the present invention.

A digital input signal $D_i$, having a word length of n bits (e.g., 20 bits) is input to a first non-linear device (NLD) 10. The first NLD 10 has a transfer characteristic such that the word length of the digital input signal $D_i$ is reduced from n bits to m bits for the first reduced word-length signal $M_e$ (e.g., from 20 bits to 16 bits, as in a usual CD signal). The transfer characteristic is non-linear, e.g., the quantization step for small amplitudes is larger than the quantization step for large amplitudes. The gain for small amplitudes may be substantially equal to one (linear characteristic), while for large amplitudes, the gain decreases. An example for such a transfer characteristic is the following function:

$M_e/D_i = c_1 \tan h(c_2 D_i + c_3)$, $c_1$, $c_2$ and $c_3$ being predetermined NLD parameters $NLD_p$.

In general, the characteristic function of the first NLD 10 should comply with the requirements that the function should be monotonous over the input signal range, that for zero input value, the output value should be substantially zero (i.e., in the above equation, $c_3 \approx 0$, and preferably $c_3 = 0$), and that the output value for negative input values should be substantially equal to minus the positive input value (i.e., $f(-x) \approx -f(x)$). Of course, the characteristic function should also comply with the primary objective of the first NLD 10, i.e., to reduce the word length of the digital input signal $D_i$ from n bits to m bits.

Preferably, a noise signal N is added to an original digital input signal $M_t$ to obtain the digital input signal $D_i$. The noise signal N is generated utilizing a pseudo-random dither-noise source 12. The noise signal N is added to the original digital input signal $M_t$ by adder 11, resulting in the digital input signal $D_i$.

The characteristic of the added noise signal may be determined by noise parameters $N_p$, such as the probability density function (pdf), amplitude, seed value, etc. The noise parameters $N_p$ are chosen to affect the original digital input signal $M_t$ at a predetermined level such that a constant output signal (which is highly undesirable) is prevented. This step is also known in the art as dithering a signal. When the original digital input signal $M_t$ is a digital data stream representing an audio signal, the added noise signal may deteriorate the audio signal, ranging from hardly audible to clearly audible. To have a sufficient effect on the signal after it has passed the first NLD 10, the added noise signal should have an amplitude which is large enough to accomplish a dither effect in the signal after the first NLD 10.

The digital input signal $D_i$ (including the added noise signal N) is input to the first NLD 10. A rather high distortion of the original digital input signal $M_t$ by the noise signal N may still be discernible for the human ear, although with a noticeable decrease of signal quality. Moreover, by controlling the noise parameters $N_p$, the overall SNR may be influenced.

The reduced word-length signal $M_e$ may be recorded on a recording medium 13, such as a compact disc. This compact disc 13 thus comprises the reduced word length signal $M_e$ having an m-bit word length. For reasons of clarity, the further signal processing for recording a digital signal on a compact disc 13, such as the error correction and EFM modules, have not been depicted. When, as discussed before, m has the value 16, the compact disc 13 with the reduced word-length signal $M_e$ may be played back on a conventional 16-bit compact disc player. As the original input signal $M_t$ has been non-linearly modified, the replayed signal will, however, be more or less distorted, depending on the amount of the noise signal added by the noise source 12 and the amount of distortion introduced by the first NLD 10. Alternatively, the reduced word-length signal $M_e$ may be transmitted by means of a transmission medium, such as the Internet or a telephone line, to a receiver.

For recovery of the original input signal $M_t$, the reduced word-length signal $M_e$ is input into a second NLD 14. The second NLD 14, having a characteristic inverse to that of the first NLD 10, transforms the m-bit reduced word-length signal $M_e$ into an n-bit decoded signal $M_d$. Of course, the decoded signal $M_d$ will comprise quantization noise caused by the subsequent operations on the signal by the first NLD 10 and second NLD 14.

The addition of the noise signal N to the original digital input signal $M_t$ and the subsequent non-linear operation by the first non-linear device 10 provides a reduced word-length signal $M_e$, in which the SNR for small amplitudes is smaller than the SNR for large amplitudes. However, the second non-linear device 14 reduces the relatively large noise component for small amplitudes and amplifies the relatively small noise component at large amplitudes, thus resulting in a substantially constant SNR over all amplitudes.

In a preferred embodiment, the added noise signal may be subtracted from the decoded signal $M_d$ by a subtraction element 15, providing an n-bit output signal $M_o$ which is substantially equal to original digital input signal $M_t$. For this, preferably, a second noise source 16 (possibly identical to the noise source 12) is used, which may generate the noise signal to be subtracted from the decoded signal $M_d$ using the noise parameters $N_p$. For a good operation, the second noise signal $N_2$ should be synchronized with the reduced word-length signal $M_e$.

Both the NLD parameters $NLD_p$ and the noise parameters $N_p$ may be fixed values. In this case, these parameters may be included in the first NLD 10, second NLD 14, noise source 12 and second noise source 16, e.g., by storing the parameters $NLD_p$, $N_p$ in an associated memory element (not shown).

In a preferred alternative embodiment, the parameters $NLD_p$, $N_p$ are variable parameters, which may be transferred together with the reduced word-length signal $M_e$. When the reduced word-length signal $M_e$ is recorded on a compact disc, as discussed above, the parameters may be stored in the sub-code of the compact disc, but, alternatively, may be stored by employing a physical change in the compact disc, such as pit-length modulation or pit-depth modulation. The solution with the physical change provides the additional benefit that a normal compact disc copy operation will only copy the reduced word-length signal $M_e$, and not the physically encoded parameters $NLD_p$, $N_p$. This provides a good anti-copy protection, as the reduced word-length signal $M_e$ can not be transformed to the n-bit output signal $M_o$ without the added noise signal N.

Of course, the parameters $NLD_p$, $N_p$ and the reduced word-length signal $M_e$ may be transferred over separate channels, either physically separated channels or channels separated in the time domain. It is, e.g., possible to provide the reduced word-length signal $M_e$ as a preview (or better, pre-listen) signal, e.g., via the Internet. The preview signal $M_e$ has a reduced quality (lower SNR) compared to the original digital input signal $M_i$, but the NLD parameters $NLD_p$ and noise parameters $N_p$ are chosen such that the signal is still acceptable for preview purposes. Only after payment, the parameters $NLD_p$, $N_p$ will be made available via a separate channel (e.g., a secure Internet connection), in order to allow recovery of the output signal $M_o$ with high quality.

It will be apparent to the person skilled in the art that other variants are possible, such as only either the NLD parameters $NLD_p$ or the noise parameters $N_p$ being variable. The fixed parameters may then be included in the replay equipment (buried in silicon), while the variable parameters are transferred with the reduced word-length signal $M_e$.

In a further embodiment, noise-shaping techniques are applied when generating the noise signal N to be added to the original digital input signal $M_i$, allowing, e.g., a feedback of the quantization error caused by the first NLD 10.

Figure 2:
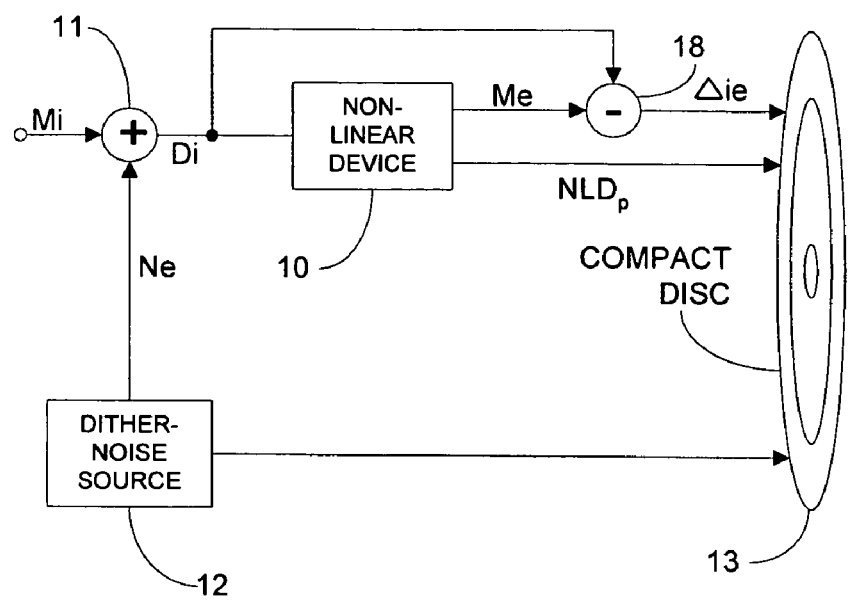
FIG. 2 shows a block schematic diagram of a second embodiment of the present invention.

In an even further embodiment, as shown in FIG. 2, the reduced word-length signal $M_e$ is not recorded, but rather, the difference $\Delta_{ie}=D_i-M_e$, as formed in difference circuit 18, is recorded. For certain applications, such a coding technique may provide further advantages, such as requiring a reduced word-length signal $M_e$ to be recorded with an even lower word length.

Thus, the present method enables recording an original digital data signal $M_i$ having a high dynamic range on a medium using a reduced word-length signal $M_e$ (with a lower dynamic range) and recovering an output signal again having a high dynamic range. The present method provides a backwards compatibility with older recovery equipment arranged for recovering a signal with the reduced word length of M bits, although some signal degradation may occur caused by the non-linear word-length reduction of the first NLD 10 and the addition of dither noise from the noise source 12. As mentioned before, copying of the recorded signal and associated parameters $NLD_p$, $N_p$, e.g., on a compact disc 13, using generally available equipment may be prevented using certain modulation techniques. The present method also enables improving the performance of, e.g., compact disc players by increasing the maximum dynamic range of the output signal $M_o$ while retaining backwards compatibility.

The invention claimed is:

1. A method for reducing the number of bits of a digital input signal, said method comprising the steps of:
    adding a pseudo-random noise signal to the digital input signal to form an intermediate signal, the pseudo-random noise signal being defined by noise parameters; and
    quantizing the intermediate signal having a word length of n bits to a reduced word-length signal having a word length of m bits, where n and m are integers, n being larger than or equal to m, the quantizing of the intermediate signal including a first transfer function which is non-linear, the first transfer function being defined by non-linear device parameters, a quantization step of the first transfer function for small amplitudes being smaller than a quantization step for large amplitudes,
wherein the gain of the first transfer function is substantially equal to one for small amplitudes, and wherein the gain decreases for large amplitudes,
and wherein the first transfer function equals:

$$M_e/D_i = c_1 \tan h(c_2 D_i + c_3),$$

in which $M_e$ is the reduced word-length signal, $D_i$ is the intermediate signal, and $c_1$, $c_2$, $c_3$ are the non-linear device parameters.

2. The method as claimed in claim 1, wherein the amplitude of the pseudo-random noise signal is at least equal to a predetermined noise value.

3. A method for generating and recording on a recording medium encoded signals from a digital input signal, said method comprising the steps of:
    adding a pseudo-random noise signal to the digital input signal to form an intermediate signal, the pseudo-random noise signal being defined by noise parameters; and
    quantizing the intermediate signal having a word length of n bits to a reduced word-length signal having a word length of m bits, where n and m are integers, n being larger than or equal to m, the quantizing of the intermediate signal including a first transfer function which is non-linear, the first transfer function being defined by non-linear device parameters, wherein said method further comprises the step of:
    recording the reduced word-length signal, the non-linear device parameters and the noise parameters as the encoded signals on a recording medium,
in which the recording medium is a compact disc and the reduced word-length signal is recorded on a first channel, and the non-linear device parameters and the noise parameters are recorded on a second channel, the first channel and second channel being separate channels.

4. A method for generating and recording on a recording medium encoded signals from a digital input signal, said method comprising the steps of:
    adding a pseudo-random noise signal to the digital input signal to form an intermediate signal, the pseudo-random noise signal being defined by noise parameters; and quantizing the intermediate signal having a word length of n bits to a reduced word-length signal having a word length of m bits, where n and m are integers, n being larger than or equal to m, the quantizing of the intermediate signal including a first transfer function which is non-linear, the first transfer function being defined by non-linear device parameters, wherein said method further comprises the steps of:

forming a difference signal, the difference signal being equal to the intermediate signal minus the reduced word-length signal; and recording the difference signal, the non-linear device parameters and the noise parameters as the encoded signals on a recording medium.

5. A signal processing apparatus comprising:

a pseudo-random noise generator for generating a noise signal defined by noise parameters;

an addition element connected to the pseudo-random noise generator for adding the noise signal to a digital input signal thereby forming an intermediate signal; and a first quantizing element connected to the addition element for transforming the intermediate signal, having a word length of n bits into a reduced word-length signal having a word length of m bits, n and m being integers and n being larger than or equal to m, wherein, the quantizing element has a non-linear transfer function, the non-linear transfer function being defined by non-linear device parameters, wherein a quantization step of the non-linear transfer function for small amplitudes being smaller than a quantization step for large amplitudes, the gain of the non-linear transfer function being substantially equal to one for small amplitudes, and the gain decreasing for large amplitudes, and wherein the non-linear transfer function equals:

$$M_e/D_i = c_1 \tan h(c_2 D_i + c_3),$$

in which $M_e$ is the reduced word-length signal, $D_i$ is the intermediate signal, and $c_1$, $c_2$, $c_3$ are the non-linear device parameters.

6. A signal processing apparatus comprising:

means for adding a pseudo-random noise signal to a digital input signal to obtain an intermediate signal, the pseudo-random noise signal being defined by noise parameters; and means for quantizing the intermediate signal, having a word length of n bits, to a reduced word-length signal having a word length of m bits, n and m being integers and n being larger than or equal to m, wherein the quantizing means includes a first transfer function which is non-linear, the first transfer function being defined by non-linear device parameters, wherein a quantization step of the first transfer function for small amplitudes being smaller than a quantization step for large amplitudes, the gain of the first transfer function being substantially equal to one for small amplitudes, and wherein the gain decreases for large amplitudes, and wherein the first transfer function equals:

$$M_e/D_i = c_1 \tan h(c_2 D_i + c_3),$$

in which $M_e$ is the reduced word-length signal, $D_i$ is the intermediate signal, and $c_1$, $c_2$, $c_3$ are the non-linear device parameters.

* * * * *